United States Patent [19]

Maus et al.

[11] Patent Number: 5,792,392
[45] Date of Patent: Aug. 11, 1998

[54] LENS THICKNESS ADJUSTMENT IN PLASTIC INJECTION MOLD

[75] Inventors: Steven M. Maus, Osseo; George J. Galic, Columbia Heights, both of Minn.

[73] Assignee: Galic Maus Ventures, Columbia Heights, Minn.

[21] Appl. No.: 803,854

[22] Filed: Feb. 28, 1997

[51] Int. Cl.[6] .................................................. B29D 11/00
[52] U.S. Cl. .......................... 264/2.5; 264/2.2; 264/40.5; 425/150; 425/808
[58] Field of Search .............................. 264/2.2, 2.3, 2.5, 264/40.5; 425/150, 808, 451.5, 451.6

[56] References Cited

U.S. PATENT DOCUMENTS

| | | |
|---|---|---|
| 4,008,031 | 2/1977 | Weber . |
| 4,184,835 | 1/1980 | Talbot . |
| 4,364,878 | 12/1982 | Laliberte . |
| 4,540,534 | 9/1985 | Grendol . |
| 4,664,854 | 5/1987 | Bakalar . |
| 4,778,632 | 10/1988 | Bakalar . |
| 4,793,453 | 12/1988 | Maus . |
| 4,828,769 | 5/1989 | Maus . |
| 4,900,242 | 2/1990 | Maus . |
| 4,933,119 | 6/1990 | Weymouth, Jr. . |
| 5,376,317 | 12/1994 | Maus . |
| 5,512,221 | 4/1996 | Maus . |

FOREIGN PATENT DOCUMENTS 61-66623  4/1986  Japan .

*Primary Examiner*—Mathieu D. Vargot

[57] ABSTRACT

Method and apparatus for lens thickness adjustment in injection molding of thermoplastic vision-corrective spectacle lenses without manual addition or removal of shims, of inserts or of any other mold part. Thickness adjustment can be made quickly between molding cycles with a simple manual setting and locking step while the lens mold is kept at very hot operating temperatures, yet with minimal risk of burning the operator. A rotatable adjustment head is mounted externally onto the mold's operator side, and manually-driven rotation turns a threaded screw which engages a mechanical assembly which produces an axially perpendicular motion which in turn drives forward or back the settable position of an optically polished insert within the lens mold's cavity. Preferably, this manually-driven rotation turns a worm gear mechanism which rotates a threaded male shaft within a mated threaded female bore axially perpendicular to the parting line. The mated threaded shaft and bore are part of a loadbearing support assembly joined to an optical insert which is one of an opposing pair within a lensmold cavity. The shaft's rotational displacement produces an axial change in the separation distance of these opposing inserts, and thereby a change in lens thickness. Alternatively, a toggle mechanism replaces the worm gear, shaft and bore assembly.

17 Claims, 3 Drawing Sheets

Comparative Example

LENS THICKNESS ADJUSTMENT IN PLASTIC INJECTION MOLD

FIELD OF THE INVENTION

The field of the present invention is improved method and apparatus for injection molding of thermoplastic optical lenses. Most specifically, these improved methods and apparatus for adjustable control of precise lens thickness of a "FSV" finished single vision (wherein both the front and the back lens surfaces & thicknesses therebetween are unchanged from time of demolding to being inserted into a spectacle frame) lens design comprising a series of varying optical magnifying/demagnifying powers of ophthalmic vision corrective spectacle lenses (commonly known as "Rx spectacle lens") are especially well-adapted to multicavity injection-compression molding.

BACKGROUND ART

Major shifts in market trends and market share have occurred in the last ten years, with the emergence of "thin and light" Rx spectacle lenses. "Thin" is important to having an attractive appearance for the spectacle wearer (specifically avoiding the undesirable "coke bottle lens" image of wearers of high minus power/demagnifying/ myopic prescription lenses for correction of their near-sightedness). "Light" is important because the average spectacle frame places two-thirds of the combined weight of the frame plus lens onto the bridge of the nose, and the greater the weight, the more uncomfortable to the wearer.

This trend to "thin and light" is specifically why in the U.S., glass Rx spectacle lenses now constitute less than 20% market share, and the fastest growing segment is polycarbonate thermoplastic injection molded lens, at center thicknesses ranging from 1.0–1.5 mm, when measured at the optical center in a high minus power lens (in contrast to standard "hard resin" thermoset cast CR-39 lens which cannot safely pass FDA lens safety impact tests at thicknesses much less than 2.0 mm). Because of consumer awareness of "thin and light" benefits, lens product advertising and promotion now prominently features the lens' thickness, so accordingly manufacturing QC practices must accurately measure and control the lens thickness, most commonly now to a plus or minus 0.1 mm tolerance from the nominal advertised value. (Only a dozen years ago, it was not possible to buy Rx FSV thinner than 2.0 mm in USA ).

However, to do this desirable control of lens thickness while managing a production schedule of some 300 or more different combinations of magnifying or demagnifying power with astigmatic power (employing, in turn, mold cavities of hundreds of different convex and concave optically polished mold inserts) has turned out to be a major problem. Typically, such convex and concave lens mold inserts were originally made to a very precise dimensional tolerance themselves. Then, pairing up 1 each of these convex and concave lens mold inserts within each injection mold cavity could thereby assure that the resulting injection molded thermoplastic Rx spectacle lens' thickness will be within dimensional tolerances. However, as a matter of practical operation, when these optically polished mold inserts become scratched or flawed in their optical polished surfaces, the common practice of abrasively lapping/ repolishing such scratches removes metal from the original insert, thus reducing its thickness or height dimension. Since such repairs are common and inevitable in the current practice, due to handling damage putting the inserts into and out of the moldsets to change the optical powers of the resulting molded lenses, soon the original inventory of optically polished mold inserts has randomly changed in their thicknesses. Refer to FIG. 5, "Comparative Example", which shows in cross-sectional view a "prior art" lens mold cavity. Most commonly, the answer has been to place a shim (#27) behind each insert to compensate for its thickness reduction vs. original dimensions. Thus, each time a mold cavity is assembled becomes 1 or more iterations of finding the right combination of shims to assemble with any given pair of convex & concave inserts, to make the lens thickness and power to come out right. Alternatively, thick plating can be put onto either front or back faces of the insert to compensate for its thickness reduction from repair work, then re-grind to size. Both "plating up/regrinding" and assembly with shims have cost and convenience disadvantages which are overcome by the present invention.

Even if somehow all original insert thicknesses met the nominal tolerances and even if there never was any repair or alteration of those dimensions, the conventional means for injection compression molding of such Rx spectacle lenses, with few exceptions, have any provision for reproducible control and predictible settings to assure that the resulting lens thicknesses will stay within the required tolerance of the advertised nominal thickness (most specifically, to be able to hold plus or minus 0.1 mm thickness variation from nominal values, over the full range of differing optical powered lenses to be molded in such a moldset).

For reasons spelled out in the prior art patents in the field, standard injection molding makes unacceptably flawed Finished Single Vision series of polycarbonate Rx spectacle lenses, most specifically creating "knitlines" in minus-powered lenses. That is why the only relevant process is various forms of injection-compression molding "hybrid process", so the prior art patents in injection-compression molding of thermoplastic Rx spectacle lenses will now be reviewed, with a view for how to reproducibly assure that the resulting molded lenses are within the thickness tolerance of the nominal values. Of these prior art patents, Laliberte (U.S. Pat. No. 4,364,878) is believed to be the first commercially significant of such patents, as it is believed to be the method employed by Gentex, who introduced the first commercially successful line of such Finished Single Vision series of polycarbonate Rx spectacle lenses (however this lens series was of a "industrial safety" thickness of at least 3.0 mm, or greater than twice the thickness of today's "thin and light" polycarbonate Rx spectacle lenses). Refer to Laliberte column 8, lines 43–63. Notwithstanding this cited assertion to be able to control lens thickness, in actual practice the compression phase of the hybrid injection-compression process of Laliberte does not mold to "hard stops". Rather, the driving force for Laliberte compression is from hydraulic cylinder 76, which urges optical insert 63 into cavity 60. This motion provides Laliberte's compression of the injected mass of molten plastic to completely fill the cavity, and the motion ends only when the resulting resistive force of the plastic exerts an equal and countervailing force onto the face of optical insert 63, such that when this resistive force of the plastic within the cavity equals the driving force of the hydraulic cylinder, then all motion ceases at this point of force equilibrium and the spacial separation of the opposing pair of optical inserts 63 and 65 will therefore determine the resulting lens thickness of the molded lens. Any small variation in the injected mass of molten plastic, from one injection molding cycle to another, will therefore produce a corresponding increase or decrease in the lens thickness, other things being equal. As there are no mechanical hard stops in the Laliberte system, the same exact mold apparatus can thereby used to make widely differing lens thicknesses, in accordance with any variations in the injection molding process parameters and most specifically those relating to the timing sequence, and melt volume, temperature, pressure and viscosity of the injected molten plastic. In actual practice, the Laliberte process was subject to wide variations in lens thickness (one of the present invention's co-inventors managed for several years a polycarbonate Rx lens manufacturing operation which used the Laliberte process).

Another pioneering patent in this field but believed to be less commercially significant is Weber (U.S. Pat. No. 4,008,031), which employs injection-compression molding using moveable optical inserts (dies), at least one of which is mechanically connected to a controllable hydraulic cylinder, as with Laliberte, but the process sequence differs significantly. Weber also allows the final position of the optical inserts to "float" or vary from cycle to cycle, since such relative spacing between the optical inserts will be determined by their being . . . "forced apart by injected polycarbonate, then the inserts are urged together, forcing a portion of the injected polycarbonate into a pocket". . . (for overflow). Unlike Laliberte, therefore, variation in the mass and volume of injected molten plastic will not necessarily result in a corresponding change in lens thickness, since varying amounts of the plastic can be forced into this overflow pocket. Again, any teachings of a settable "hard stop" or other mechanically-positive means for reproducibly controlling the final molded lens thickness is absent in Weber.

Grendol (U.S. Pat. No. 4,540,534) follows Weber's teachings.

Takeshita (JP61-66623, of 5.4.1986) features a different form of injection-compression lens molding, wherein its overflow pocket is able to be acted upon by a hydraulic cylinder which can be energized in proportion to the measured change of a position sensor which is reading the actual position of the compression element which advances the moveable insert against the injected plastic. When this measured position indicates a less-than-desired lens thickness, then the process controller and standalone hydraulic system of Takeshita is actuated to push forward this cylinder driver into the overflow pocket and thus create an increase in lens thickness, provided that the plastic is not yet solidified in the overflow pocket or any of the passageways in fluid communication thereof with the mold cavity contents. Again, no reliable mechanical hard stops are employed.

Of the prior art patents mentioned so far, only Laliberte is believed to have been of a lasting commercially successful method, by its assignee Gentex from its inception for approximately 10 years, until recent years, when it is believed to have been superceded by Weymouth (U.S. Pat. No. 4,933,119) also owned by Gentex and featuring as its major objective the ability to mold . . . "a plurality of articles having various masses and shapes wherein a parison mass is injected . . . (and) compression molded at predetermined pressures in accordance with their shapes or masses". In other words, the limitation of Laliberte being practical only to single cavity molding apparently is improved upon by Weymouth, offering ways to mold in a multi-cavity moldset differing lens powers and curves at the same time. However, like Laliberte, Weymouth apparently relies upon the operator's variation of injected masses and temperatures and pressures and timing sequences to produce within its mold cavity a melt being compressed by what he calls . . . "variable compression pressures . . . by similar actuators which are unequally excited". . . so the compression stroke ends at an equilibrium point wherein the forces of the compressing apparatus are equal to those of the resisting melt pressure. Just like Laliberte, lens thickness is determined by where this compressive stroke "stalls out" against the melt's backpressure. Weymouth is silent on the subject of lens thickness control and is not believed to add to Laliberte in this regards.

In contrast to the abovementioned prior art, Applicants introduced to injection compression molding of such Rx spectacle lenses the approach of "molding to mechanical hard stops" within multi-cavity Rx spectacle lens molding in Maus (U.S. Pat. No. 4,828,769), now licensed to major competitors of Gentex, as commercial sources who make polycarbonate Rx spectacle lenses. "Molding to hard stops" is believed to have significant advantages in achieving the reproducible control of lens thickness. However, when changeover in accordance with the production schedule for from one optical power lens to a next lens in the series having differing optical power, the convex and concave inserts must correspondingly be changed in the mold cavity in order to affect this lens power change, yet must be capable of resisting extremely high compressive forces. Those employing the teachings of Maus U.S. Pat. No. 4,828,769 therefore would have to adjust lens thickness by means of placing precisely dimensioned shims somewhere beneath at least one of the opposing pair of inserts, either directly below that insert or somewhere within the column of mechanical support or at the junction with the clamp plate, thereby altering the final height from the clamp plate to the face of the optically polished insert when the mold is under full compression force. In this way, once suitable shims have been placed as needed within the moldset so as to correctly produce the desired lens thickness at that particular lens power, then subsequent minor process variation in the amount of injected melt, for example, will not directly change the resulting lens thickness, since excess plastic is forced back out of the mold cavity when the full compression forces of the injection molding machine's main clamp force are applied and when the variable volume mold cavity is in the final position determined by the fixed mechanical hard stops.

Thus, a more robust process which resists changes in lens thickness from the minor cycle to cycle variations inherent in the molding process is determined. However, Maus U.S. Pat. No. 4,828,769 has the disadvantage of relying upon these changeable shims being manually inserted or removed from the moldset. As previously mentioned, repolishing and lapping repairing of the optical mold inserts inevitably creates an inventory of such inserts which deviate from their original nominal thicknesses themselves. Therefore, these deviations result in corresponding deviation from the original setup and so a certain thickness of shims which worked when the inserts were originally made may no longer produce the desired lens thickness when these inserts have been repaired. Thus, an iterative process is commonly required, wherein the shims are added or removed from the moldset after some test lenses have been injection molded, measured and found to be outside of tolerance. These iterations and changes require manual addition or removal of shims by partial disassembly and removal of portions of this injection moldset by the operators.

Talbot (U.S. Pat. No. 4,184,835) employs wedge block 19 which is connected to driving force hydraulic cylinder 21, such that when this cylinder is energized, wedge block 19 is slideably displaced forward, such that its incline plane surface pushes against moveable core (mold insert) 13, thus reducing the volume of mold cavity 15 and thereby applying compressive force onto the injected molten plastic. Talbot's teachings are to energize the hydraulic cylinder and thereby drive the wedge block and correspondly move the mold insert only after . . . "a predetermined time in the molding cycle" . . . wherein freezeoff of gate 18 prevents escape of the injection molded plastic out of mold cavity 15 when these compressive forces are applied. Bakalar (U.S. Pat. No. 4,664,854 & 4,778,632) also employs a wedge shaped slide 7 connected to a hydraulic piston 9 in order to move the wedge horizontally between a home retracted position which limits free floating outward movement of female mold 5 and an operating extended position in which the wedge engages a displaced cap member. Like Talbot, Bakalar employs this wedge shaped slide member travel on each and every cycle of the injection-compression molding process as a way of imparting compressive force onto an already filled mold cavity containing injected molten plastic.

Bakalar and Talbot lacked the inventive insight to employ the slidable wedge apparatus as a way of fast and precise adjustment to molded lens thickness, done between (not within) molding cycles. In fact, both Bakalar and Talbot are silent on the subject of how to control final molded lens thickness for varying different optical powers of such Rx spectacle lenses. Bakalar and Talbot are cited merely because they mention use of a wedged shaped member as an element in their apparatus, even though drawn to a very different purpose than Applicants' present invention.

Maus U.S. Pat. No. 5,512,221 issued Apr. 30, 1996, incorporated herein by reference, is believed to be the closest prior art. Applicants' present invention improves on Maus U.S. Pat. No. 5,512,221's paired wedge blocks by offering additional mechanical alternatives which increase the design latitude of lensmolds desiring the Maus benefits.

SUMMARY OF THE INVENTION

Applicants' present invention employs additional mechanical alternatives to Maus U.S. Pat. No. 5,512,221's slideably mated pair of opposing wedge blocks as a part of a loadbearing support assembly which mechanically transmits forces between the back surface of the optically polished mold insert and the clamping platen of the injection molding machine. Like the Maus U.S. Pat. No. 5,512,221's slideably mated pair of opposing wedge blocks, the Applicant present invention's mechanical alternatives (preferably, paired threaded members driven by a worm gear assembly, or less preferably, substituted by a toggle assembly) NEVER MOVE during the injection molding cycle itself—only after a break in production, when it is necessary to adjust the lens thickness setup. Applicants' alternatives to Maus U.S. Pat. No. 5,512,221's use of such wedge blocks should not be confused with other prior art injection compression molding apparatus elements in other prior art patents cited (Talbot and Bakalar) which employ at least one slidable wedge block as a means of raising or lowering the position of a moveable core (mold insert) into or out of the mold cavity DURING the injection molding cycle, so as to transmit a compressive driving force onto the injected plastic.

Like Maus U.S. Pat. No. 5,512,221, it is an objective of Applicants' present invention to improve upon this present state of art of the other cited references, by being able to mold predictable lens thicknesses by means of a variation of mechanical hard stops, and yet to do so without manual addition or removal of shims or inserts or any other part of the mold and/or without partial disassembly or removal of modular subassemblies (such as MUD-type "unit tooling", or RD insert/sleeve ringsets) of this injection moldset by the operators. Like Maus U.S. Pat. No. 5,512,221, Applicants' present invention comprises moveable adjustment means mounted externally onto the moldset at a location easily accessible to an operator for a manually-driven motion to one of a plurality of positions. Like Maus U.S. Pat. No. 5,512,221, Applicants' present invention uses a means of a mechanical linkage between the moveable adjustment means, but unlike Maus U.S. Pat. No. 5,512,221, these motions drive a specified amount of displacement of either a paired threaded members driven by a worm gear assembly, or toggle assembly, instead of one wedge block relative to the paired opposing wedge block. As described in more detail later, the Applicants' preferred embodiment of paired threaded members driven by a worm gear assembly can operate in "H" type and "Double H" type multicavity lensmold design layouts, wherein Maus U.S. Pat. No. 5,512, 221 cannot be placed; this is one particular advantage for Applicants' present invention.

However, by either Maus U.S. Pat. No. 5,512,221 or Applicants' present invention, the resulting displacement produced will quickly yet precisely adjust the molded lens thickness without removing the injection moldset from the clamping platens of the injection molding machine, nor disassembling this injection moldset. Applicants' present invention and Maus U.S. Pat. No. 5,512,221 can thereby use several different inserts of the same nominal optically curved faces but with differing insert thicknesses, to assemble into a multicavity mold without using shims yet produce all these lenses of the same nominal thicknesses (within + or −0.1 mm tolerances). Also importantly, since these lens molds operate at very hot temperatures (typically 250–285 F.), these moveable adjustment means are mounted externally onto the moldset with sufficient thermal isolation that the operator can safely make these manual adjustment motions while the mold is maintained at its desired operating temperature, without danger of being burned. All the other prior art adjustments require operators to wait for mold cooling down, then changing out those parts of the mold (i.e. shims and/or inserts), and warming back up, thereby causing major downtime.

In the prior art (see FIG. 5), shims must be added or removed every time lens thickness needs adjustment, but that is not needed in the present invention. Every time inserts are handled increases the probability of damaging the optically polished face. Thus, reduced insert damage is another benefit of the present invention.

The present invention injection mold apparatus for molding thermoplastic spectacle lens comprises:

a. the injection mold having at least one mold cavity formed between two moldhalves which open and close about a parting line, with each moldhalf housing at least one of an opposing pair of optically polished mold inserts, each of the inserts having a surface facing into the mold cavity and each of the inserts having a back surface which faces away from the mold cavity, the insert optically polished surface facing into the mold cavity being of specified surface curvature and the opposing pair of mold inserts thereby forming partforming surfaces of the mold cavity, the insert back surface being mechanically supported against a substantially mating face of a loadbearing support assembly which is capable of transmitting forces from the insert to a clamping platen of a injection molding machine, such that melt pressures which are exerted upon the partforming surfaces are ultimately supported by a countervailing clamping force applied by the injection molding machine;

b. an mated combination of a bore within the loadbearing support assembly, the bore having a threaded female surface which is coupled to a rotary threaded male shaft, wherein a rotary displacement of the shaft causes a predetermined displacement of the insert back surface being mechanically supported against the substantially mating face of the loadbearing support assembly, so as to make proportional the rotary displacement of the shaft to a corresponding change in the thickness of the lens;

c. means for adjustment of the thickness of the lens, the means for adjustment being capable of being moved to a plurality of positions when the mold is not filled with plastic;

d. means for mechanical linkage of motions of the mated combination of the shaft operating within the bore, in response to motions of the means for adjustment, by which motions a specified amount of rotary displacement of the shaft is produced when the mold is not filled with plastic; and e. means for locking the mated combination of the shaft operating within the bore, after the adjustment is made when the mold is not filled with plastic;

such that there is substantially no slippage between the mated combination of the shaft operating within the bore during subsequent injection molding cycles.

DETAILED DESCRIPTION OF THE INVENTION

Figure 1:
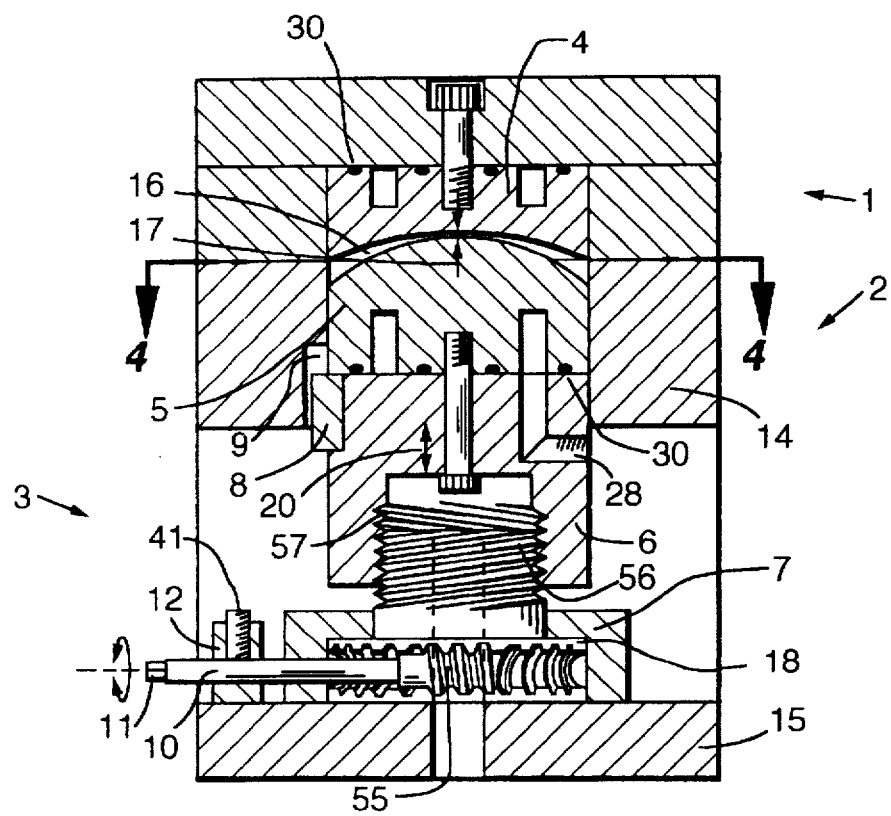
FIG. 1 shows a cross-sectional view, (A—A) as depicted in FIG. 4, of one lens mold cavity within a 2-cavity moldset of the present invention, with this one cavity being set up to produce a thinner FSV high-minus-powered lens.
Figure 2:
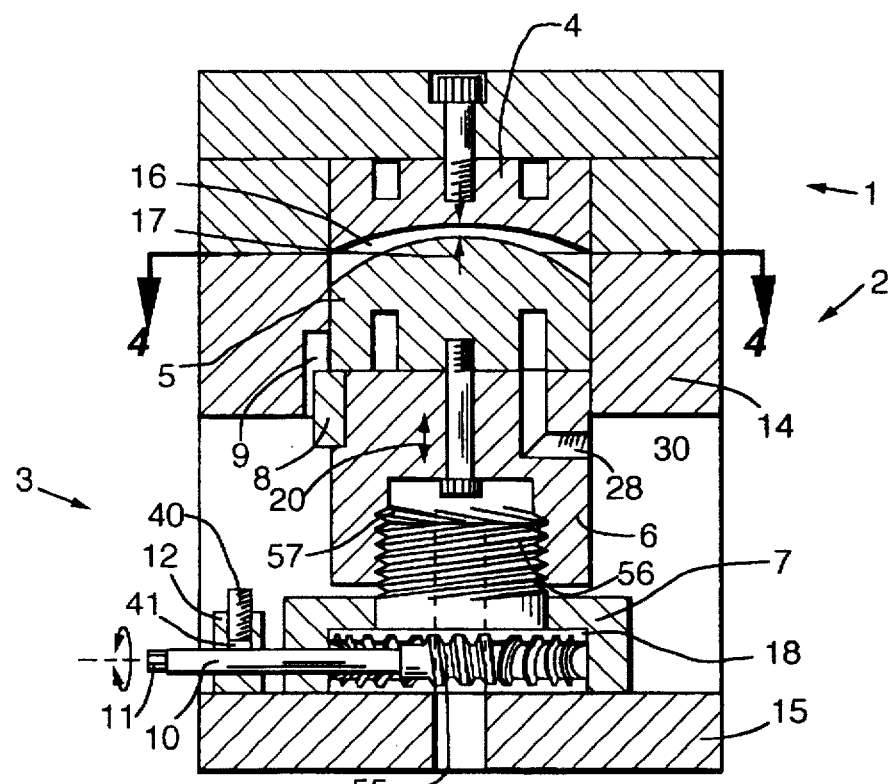
FIG. 2 shows a cross-sectional view, (B—B) as depicted in FIG. 4, of the other lens mold cavity within the same 2-cavity moldset of the present invention, with this other cavity being set up to produce a thicker FSV high-minus-powered lens.
Figure 4:
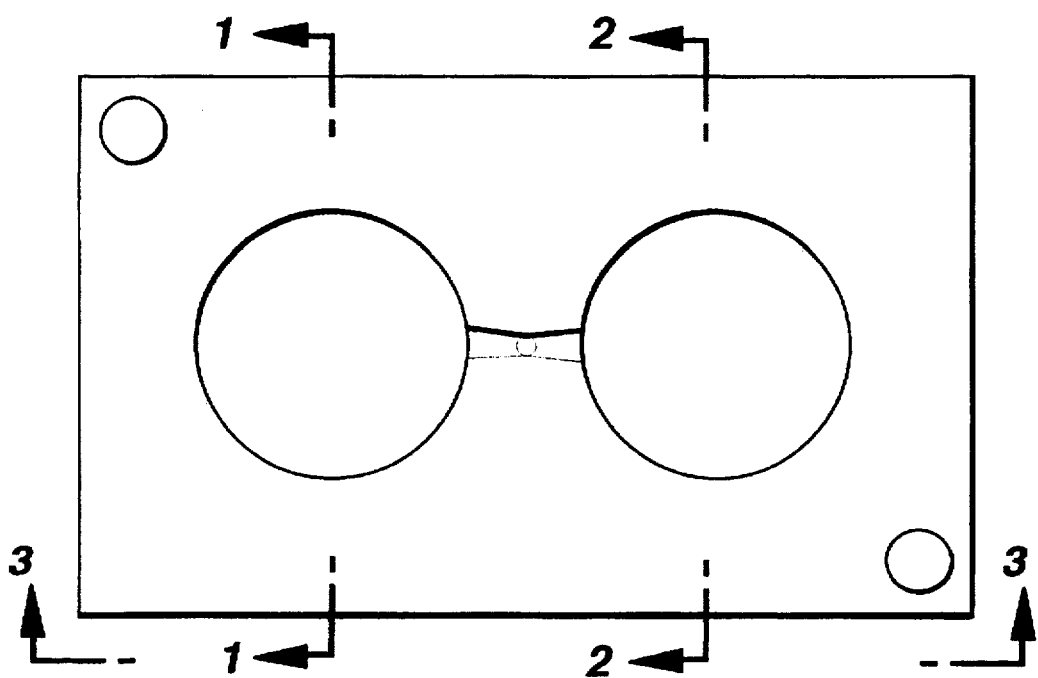
FIG. 4 shows an internal plan view, (D—D) as depicted in FIG. 2, as seen from the parting line plane of the same 2-cavity moldset of the present invention, showing how the other views are taken, and how injected plastic will flow from the sprue located at the central axis into each of the edge-gated mold cavities wherein the opposing paired inserts are housed.

FIG. 1 shows cross-sectional view (A—A) of one mold cavity within a simplified 2-cavity injection moldset (see FIG. 4 for a plan view (4—4) as seen from the parting line plane of the same 2-cavity moldset) of the present invention, with this one cavity being set up to produce a thinner FSV high-minus-powered lens. Now see FIG. 2, showing a cross-sectional view (B—B) of the other lens mold cavity within the same 2-cavity moldset of the present invention, with this other cavity being set up to produce a thicker FSV as high-minus-powered lens.

Figure 3:
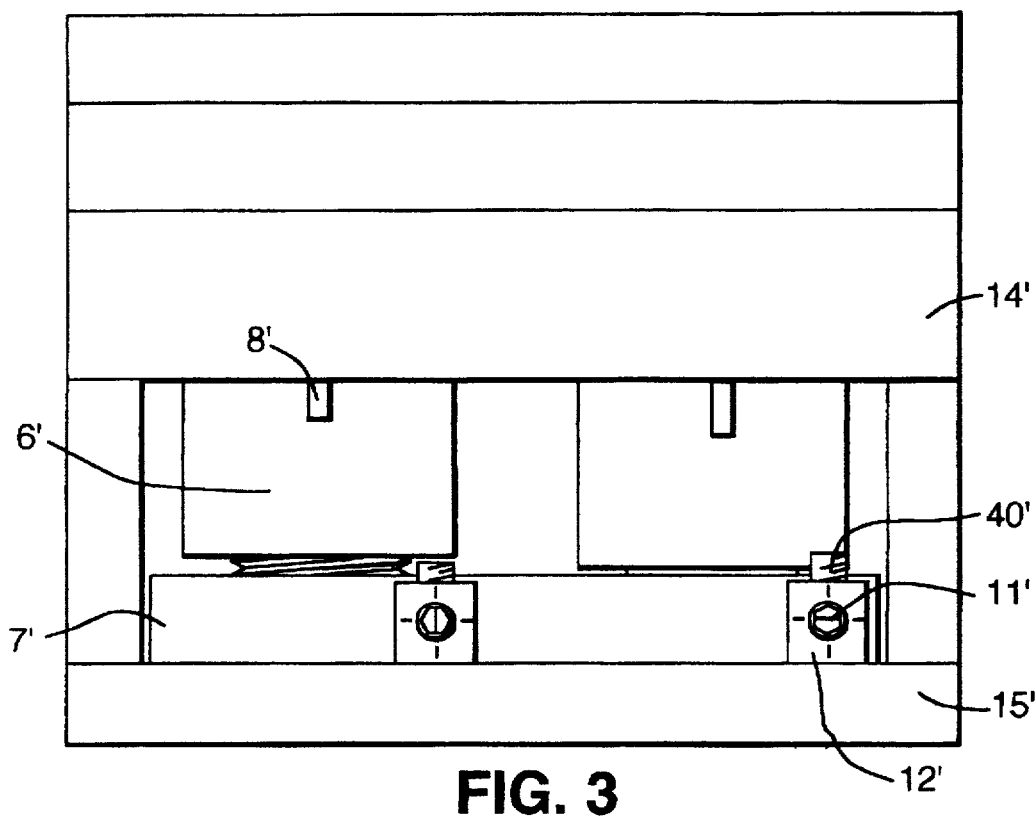
FIG. 3 shows an external side view, (C—C) as depicted in FIG. 4, of the same 2-cavity moldset of the present invention.

The injection mold has two mold halves (1) and (2), which open and close on the plane of a parting line (D—D). Each mold half houses at least one of an opposing pair of curved optically-polished mold inserts (4) and (5), and each insert is mounted with its optically-polished surface facing into the mold cavity (16). Conventionally, upon the B-side mold half (2), which is mounted onto the movable platen (not shown) of the injection-molding machine (not shown), a convex-curve-surfaced insert (5) is employed, and upon the A-side of the mold half (1), which is mounted onto the stationary platen (not shown) of the injection molding machine (not shown), is mounted a concave-curved, optically-polished-surface insert (4). The present invention is shown in FIGS. 1, 2, and 3 on the B-side mold half (2), but is not so limited; it can be used in either mold half.

Note that each of this opposing pair of mold inserts has back surfaces which are substantially flat, or planar, facing away from the mold cavity. To prevent undesirable optical prism in the resulting molded lens, this opposing pair of inserts must be co-axially aligned for good concentricity and must be firmly mounted and held against a sufficiently rigid loadbearing support assembly. This loadbearing support assembly for the insert (5) consists of female threaded member (6) mating with male threaded shaft member (56) joined to the worm wheel (18). The worm wheel (18) is driven by mating worm (55) in a predetermined gear ratio, and is supported by clamping plate (15) of the moldset. To prevent cocking or wedging with respect to the optical axis of the molded lens, the insert (5) needs to be well supported, with substantially no degrees of free motion other than a slideable fit for axially traversing forward or back within a concentric bore in B side parting line mold plate (14). Mated male key (8) and female (9) keyway located within the concentric bore will guide this axial motion firmly against rotation, even tho the axial motion is being driven by rotation of male threaded shaft (56) within mated female threaded bore (57) of loadbearing support member (6). This concentric bore surrounds the insert (5), as shown, around its O.D. perimeter within in B side parting line mold plate (14).

The present invention's means for adjusting lens thickness converts a rotational displacement taking place in a plane substantially parallel to the parting line plane into a corresponding displacement or change in position in an axial direction which is substantially perpendicular to the parting-line plane. The position of insert (5) with respect to opposing insert (4) defines a separation distance which determines the molded lens thickness. The driving force for this settable and lockable change in the position of insert (5) is, preferably, a human operator (not shown). By manually applying a torque rotational force onto a rotatable head (11) joined onto a shaft (10) having a helical threaded worm (55) which engages mating teeth at a tangential contact point with worm wheel (18) (shown rotatably housed inside cover (7)), a threaded male shaft (56) turns inside mateably threaded female bore (57) (shown rotatably housed inside loadbearing support (6)) in the direction of the torque rotational force, this change in the position of insert (5) is achieved the human operator.

Since the helical threaded worm (55) and mating worm wheel (18) are engaged by a pre-determined gearing ratio in movements in either direction of rotation, the precision of this worm-gear-drive type of lens-thickness-adjusting mechanism favors making relatively high gearing. This desirably high gear ratio can be achieved by large worm wheel diameters and/or gear-teeth-to-worm-threadpitch. To convert a full 360 degree rotation of the relatively small diameter worm "driver" into a small fraction of one corresponding "driven" rotation of relatively larger diameter wormwheel/shaft will translate into a relatively small incremental change (forward or back, depending on direction of rotation) in position of the mold insert. This preferred high gearing might require a full 360 degree rotation of the worm to move the insert by only 0.2 mm, for example, for precision. Moving the insert forward produces a thinner lens (seen in FIG. 1 crosssectional view and seen in the lefthand cavity of the 2-cavity lensmold shown in FIG. 3), and conversely, a rearward change in position of the mold insert produces a thicker lens. This setup for making a thinner lens is seen in FIG. 1 crosssectional view and seen in the lefthand cavity of the 2-cavity lensmold shown in FIG. 3 side view. Conversely, the setup for making a thicker lens is seen in FIG. 2 crosssectional view and seen in the righthand cavity of the 2-cavity lensmold shown in FIG. 3 side view.

One advantage of the present invention over the cited prior art Maus U.S. Pat. No. 5,512,221 embodiments using paired wedge blocks comes in multicavity lensmold designs where the layout of ALL of the cavities is NOT accessable to the operator when mounted inside the injection molding machine. As a practical matter, although the moldstack has 4 sides when mounted inside the injection molding machine, the top and bottom facing sides cannot be safely reached (the mold is very hot) by the operator, even when the safety gate is opened. The third side is on the mold's "Non-Operator" side, which is usually where a part-removal robot operates. Because the Maus U.S. Pat. No. 5,512,221 paired wedge blocks need to be directly acted on by the adjustment means accessable safely by the human operator, a 4-cavity in-line horizontal layout of the cavities would not be able to use the Maus paired wedge blocks on the inner 2 cavities, even if the operator has safe access to the mold's "Non-Operator" side. "H pattern" (4-cavity) and "Double-H pattern" (8-cavity) multicavity mold designs are also common layouts. The "Double-H pattern" 8-cavity horizontal layout would have 4 inaccessable "inner" cavities, even if the operator has safe access to the AS mold's "Non-Operator" side. In contrast, all these designs (even the "Double-H pattern" 8-cavity horizontal layout) can use the present invention, because to engage the wormwheel requires only a tangential intersection with the worm axis, and different elevations and angulations can be used to provide for those engagements, as commonly known to those skilled in the mold design art.

The means for adjustment are shown in FIGS. 1, 2, and 3, bolted onto one of the outer side surfaces of the operator side of the injection moldset, so as to be easily accessible to the operator for the required manual adjustments during the setup phase of use. Note that a preferred embodiment is showing a rotatable head (11) which could simply be a socket-head bolt, which can be turned with an Allen wrench or by a crank handle which suitably mates into it. The mechanical ratio of rotation relative to insert motion between positions is high, for reasons mentioned earlier. In the cited example, one "quarter-turn" (90-degree) rotation of the rotatable head will produce just 0.05 mm change in position of the mold insert, and correspondingly a 0.05 mm (or 50 micron) change in lens thickness.

Note also that, after suitable adjustment has been made, the normal frictional resistance to slippage between the mating threaded shaft (56) and bore (57) housed in loadbearing support member (6) during normal production molding cycles can be made even more positive, by the step of "locking-up" the driving mechanism. Any locking means which resists rotation of the worm (55) or the worm wheel (18) will do the job. It could be as simple as adding a lock plate (12) at an angle perpendicular to the axis of the worm and intersecting with same, then inserting a locking set screw (40). Alternatively, but not shown, a set screw inside a threaded hole through cover (7) could be advanced to prevent rotation of worm wheel (18). By either approach, the step of tightening down set screw (40) to make the desired mechanical interference against rotation, "locks up" the desired setting, as seen in FIG. 1 and lefthand of FIG. 3. By NOT tightening down set screw (40), thus creating a clearance space (41) shown in FIG. 2, the set screw is NOT in locked position to make the desired mechanical interference against rotation. The "unlocked" setting is seen in FIG. 2 and righthand of FIG. 3.

When the setting is locked, relative positions of the opposing pair of inserts (4) and (5) remain frozen until the next time production is stopped and thickness adjustment needs to be made again, at which time the locking set screw (40) is first turned to loosen before rotating the adjustment head. Other locking means (not shown) for preventing slippage between the threaded members can include placing a fitted bar (i.e. a hex opening sized to fit a hex socket head) across the adjustable head and clamping it in place.

Also, in FIG. 3, note that a 4-quadrant scale can be engraved onto the moldset and that partial rotation can be measured and recorded "before" and "after" in 90 degree increments. For example, see that in the lefthand cavity set for a thinner lens, alignment of the slot in rotatable head (11') is shown to be vertical, whereas in the righthand cavity set for a thicker lens, alignment of the slot in rotatable head (11') is shown to be horizontal, with respect to 90 degree marks made in the stationary mounting pad. In this way, a readout of the relative displacement change can be readily seen and marked down by the operator while he is adjusting it, by counting the number of full rotations (360 degrees each)+the number of quarter turns (additional 90 degrees), for recording into a data log, charting each of the settings made at each of these molding setups with a log of the corresponding actual lens thickness, for good recordkeeping.

Figure 6:
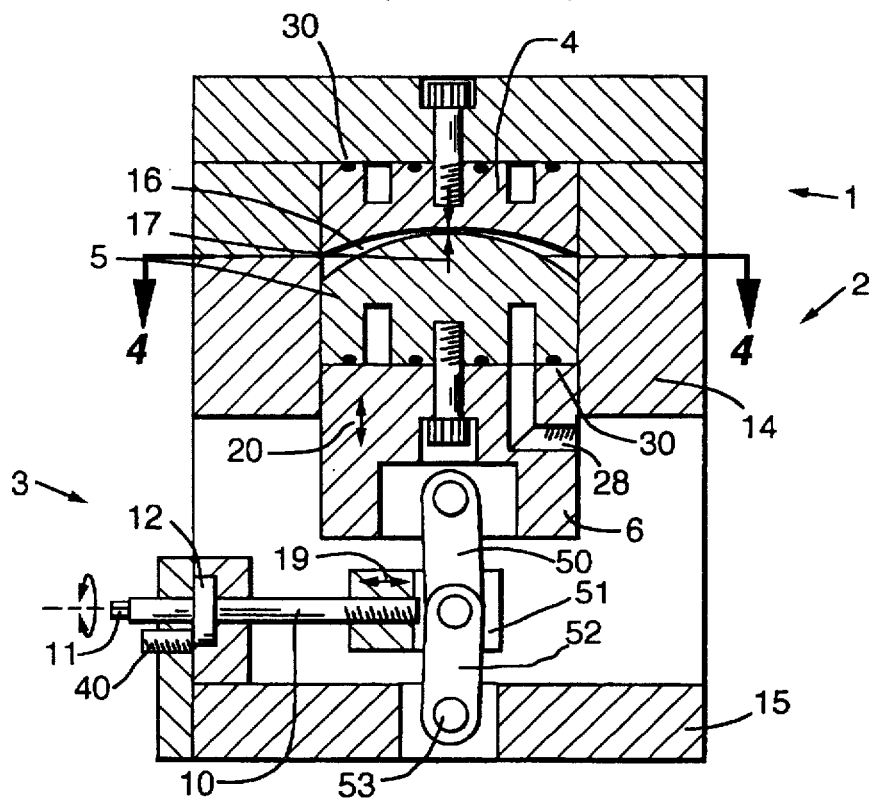
FIG. 6 shows a cross-sectional view of an alternative but less preferred embodiment of the present invention, using a toggle means for lens thickness adjustment, instead of worm gear means of the present invention.

See FIG. 6. Alternative means for mechanical linkage of the motions of the mold insert and its support members while housed within the injection moldset can be envisioned, even though the wormgear combination of FIGS. 1 and 2 is believed to be preferred. Less preferred but functional equivalents of it could include the same rotatable shaft driving at least one toggle, as substitute for the wormgear assembly and mated threaded members, to move, alternatively forward or back, the support (6) and mold insert (5). A single toggle is shown (the assembly of (50), (51), (52) and (53), driven by threaded shart (19)), but a double toggle might be used. In such an embodiment, a crank handle with set screw (40) would be a lockable means for adjustment, with the crank handle being external to the injection mold and accessible to an operator for manual motion. However, it is believed that the toggle is a less preferred means for raising and lowering the insert with respect to the parting line (and thereby adjusting lens thickness) because it would provide less precision (lacking the high gear ratios possible by the wormgear). Also, it may be less compact (always important in mold design), and unless the toggle is fully extended to vertical, it will have poorer loadbearing when the plastic is pushing onto the insert face (so, pushing harder onto the setscrew lockup).

An optional but preferred element in the injection-molded apparatus assembly would be provisions for circulating a heat-transfer fluid within the mold insert. By firmly mounting the back surface of mold insert against the loadbearing support (6), as shown, this desirable thermodynamic feature can be built in by drilling water lines (28) into this loadbearing support (6) and aligning these with the respective inlet and outlet holes on the insert's back, thereby providing for flow within a suitable pattern of cooling channels (29) machined within the insert. To prevent water leaks, suitably-dimensioned O-ring (30) grooves are cut into either the front surface of the loadbearing support (6) or the back surface of the insert (5) as shown, such that when the insert's back surface is tightly drawn against the support's front surface by the insert retention bolt as shown, the O-ring within the groove is suitably compressed to provide a positive seal, thus preventing water leaks.

Applicants' U.S. Pat. No. 4,793,953, incorporated herein by reference, teaches an especially preferred way of improving heat-transfer rates in such optical thermoplastic injection molding by employing chrome or nickel electroplated films which are then abrasively polished into optical surfaces onto a monolithic beryllium-copper mold insert construction, wherein the monolithic insert also contains such channels for circulating heat-transfer fluids. A special case for improved thermodynamics in precision-replicated optical injection molding of thermoplastics, which also employs high thermal conductivity BeCu optical mold inserts, is taught in Applicants' U.S. Pat. No. 5,376,317, also incorporated herein by reference.

Looking now upon the loadbearing support (6), it offers a substantially-planar front surface against which the back surface of the mold insert (5) is firmly mounted, typically by insert retention bolt drawn tightly, as shown. The loadbearing support (6) shown here could alternatively have other geometries or shapes such as a rectangular mold plate, but most commonly, would be a cylindrically-shaped piece with a round, flat forward end and (seen in plan view) an end with sidewall which may have a slideable fit within a concentrically-enclosing bushing or sleeve which forms the bore of mold plate (14) element of the B side mold half. See FIG. 3. In either embodiment, the bottom surface or back surface of worm wheel (18) (hidden by cover (7')) is held against support clamp plate (15'), firmly seated and housed in the injection moldset so as to provide an unbroken chain of high loadbearing capability, such that when high packing forces by the injected molten plastic are exerted upon the optically-polished, part-forming surfaces of the mold cavity, these forces are transmitted back through the mold insert, through its loadbearing support assembly, and ultimately supported by the injection moldset, which in turn is supported by a countervailing clamping force applied by the injection molding machine. In this way, high injection melt pressures can be exerted within the mold cavity without significantly shifting the relative concentric axial positions of the opposing mold inserts, so as not to permit any axial-tilt deviations or "wedging" or "cocking" problems. FIG. 3 shows an external side view, (C—C) as depicted in FIG. 4, of the same 2-cavity moldset of the present invention, showing how the moveable adjustment means (11') and locking means (40') are mounted so as to be easily accessible to an operator for a manual motion to one of a plurality of positions, with sufficient thermal isolation that the operator can safely make these manual adjustment motions while the mold is maintained at its desired operating temperature without danger of being burned. Note that the lefthand cavity (shown in FIG. 1 being set up to produce a thinner FSV high-minus-powered lens) is showing the loadbearing support (6') in a more advanced-forward position, compared to the righthand cavity (shown in FIG. 2 being set up to produce a thicker FSV high-minus-powered lens) which is showing the loadbearing support (6') in a more retracted-back position. Both loadbearing supports (6') move axially without rotation, guided by key (8').

Typically, the present invention can move the insert (5) by up to 5 mm. This has the advantage of allowing the same pair of opposing inserts to make a wide lens product range. For example, the most desirable consumer Rx eyewear is "thin and light", a magic appeal which calls for 1.0 mm cente thickness high-minus-powered lens. On the other hand, until recently, Rx safety spectacle lenses for industrial workers had to be at least 3.0 mm thick, for maximum protection, and some companies still specify those lens. These and all in-between thicknesses can be precisely made, with the same tooling, without any disassembly or long downtime. Even when re-ground during repairs, shorter-than-original-design inserts are now still useable.

Although the present invention can be advantageously used with certain forms of injection-compression molding processes, it can also be used with the more well-known coining processes and with straight injection just as well. But because the highest degree of difficulty in molding optical lenses is to mold high-minus-powered spectacle lenses which are desirably as thin and light as possible, (wherein the high-minus-powered lens inherently must have a very thin center thickness—desirably 1.0–1.5 mm—and yet, typically a very high edge thickness—10 mm or greater—this special case is worth attention. It is well known to those skilled in the art that some form of injection-compression molding process sequence which utilizes a pre-enlarged, variable-volume mold cavity construction is required in order to minimize knit lines during filling with these high-minus-power lens geometries. Thus, on each such injection-compression molding cycles, the lens mold cavity is sufficiently oversized at the start of each injection cycle so as to present a variable-volume cavity with sufficiently great cavity height that the meltflow path would be relatively nonconstrictive, compared to a conventional injection mold during the filling operation.

Examples of such suitable injection-compression molds, having variable-volume mold cavity construction, include the cited prior art references of Laliberte and Weymouth, as well as Applicants' U.S. Pat. No. 4,828,769 and U.S. Pat. No. 4,900,242, both incorporated herein by reference. In each of these variable-volume mold cavity constructions using an injection-compression process sequence, the compression stroke is applied to the injected melt by creating a relative motion between a part-forming mold insert having an optically-polished face of precise curvature with respect to the parting-line reference plane. This is typically accomplished by a forward motion of the mold insert axially within the concentric bore of the surrounding moldset, wherein the insert has a slideable fit. Various driving forces for this compression stroke can be seen in these cited prior-art patents, ranging from hydraulic cylinders mounted within the moldset to employing the main clamping force of the injection molding machine, in conjunction with floating mold plate elements, which are spring-loaded. These, and other prior-art patents cited earlier, may vary upon the way in which the final lens thickness is determined. As described earlier, some "mold to hard stops" (including Applicants' cited patents), and others end their compression stroke when the resistive forces of the melt equal the compressive driving force, at which point no further motion stroke results and the final lens thickness is thereby determined. In each of these prior-art references, the changeable position of the mold insert with respect to the parting line is simply to provide the injection-compression stroke as an improved way of forming the resulting molded spectacle lens. All these references are silent regarding any way of settably adjusting final lens thickness without disassembly of the moldset.

Figure 5:
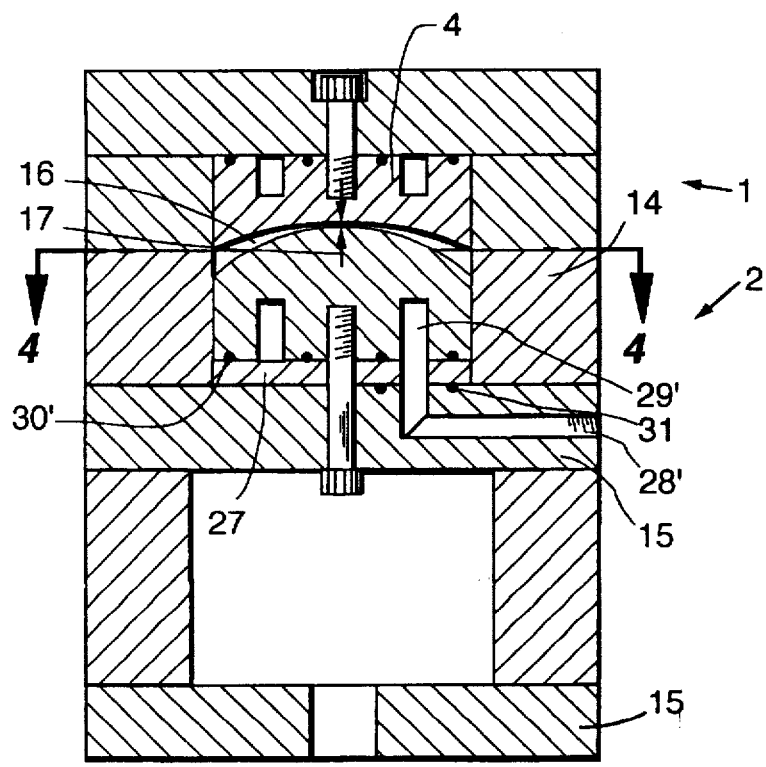
FIG. 5 shows a cross-sectional view of a "Comparative Example" of the cited prior art, using shims for lens thickness adjustment, instead of worm gear means of the present invention.

See FIG. 5, labeled "Comparative Example". Shown in cross-sectional view is a mold cavity wherein the final lens thickness is settably adjusted by use of one or more shims (27). With no shim in the moldset, this mold cavity will have the optically-polished surface of the mold insert at its maximum separation distance from the parting-line reference plane (4—4), to thereby reach its maximum final part thickness (17). To reduce this final part thickness of the molded lens requires adding shims in the position shown—successively thicker shims give correspondingly thinner lens. However, access to such change in shims inherently involves significant disassembly of the mold, which in turn requires waiting a long time, since, in operation, these thermoplastic injection molds run very hot temperatures (typically, within 10–30 degrees C. of the glass-transition temperature of the amorphous thermoplastic optical-grade resin). The operator must, therefore, wait until the moldset is sufficiently cooled so as to allow manual disassembly without burning one's hands. Once the disassembly has been made and the correct shim has been placed and reassembled, then a significantly-long time must again be waited until the moldset is sufficiently heated back again, so as to make good quality lenses.

Another limitation of the prior art as shown in FIG. 5, "Comparative Example", is that it is much more difficult to avoid water leaks from around the O rings (30') and (31), since there are twice as many needed in this FIG. 5 design vs. the present invention shown in FIG. 1 and 2. Furthermore, the shim may not perfectly mate with the planar surfaces of the insert's back and the support's face, if both sides of the shim are not both flat and parallel, thus causing leaks. Each time a different lens power needs to be run in the production schedule, the inserts must be removed and a new set installed, thus requiring a new set of shims. Each such changeover assumes a perfect mating at each of the 2× more O rings, or else the highly-pressurized water (circulating at 250–285 F. temperature) will find any tiny leaks and force a shutdown to re-assemble, iteratively, until finally all cavities in the multi-cavity lens mold is running leak-free. Substituting oil instead of pressurized water reduces the line pressures which forces fluid through tiny leaks, but at these temperatures oil is extremely low viscosity, and it will migrate from any tiny leaks up onto the optically-polished part-forming surfaces of the inserts, thus causing rejectable surface blemishes onto the molded lens; thus, oil is worse than water even tough its leak volume might be far smaller, because this pressurized water quickly is converted to steam and evaporates away, unless the leak is larger. For these reasons, most known prior art injection-compression Rx FSV lens molds are now running with no circulating heat transfer whatsoever within the inserts, even though the molding cycle times are greatly lengthened thereby, and total output is lowered accordingly, without circulating a heat transfer fluid within the insert near the surfaces wetted by the plastic melt.

We claim:

1. An injection mold apparatus for molding thermoplastic spectacle lens, said injection mold having a mechanism for determining a thickness of said lens by precisely adjusting and then locking into a fixed position said mechanism, the apparatus comprising:

a. said injection mold having at least one mold cavity formed between two mold halves which open and close about a parting line, with each mold half housing at least one of an opposing pair of optically polished mold inserts, each of said inserts having a surface facing into said mold cavity and each of said inserts having a back surface which faces away from said mold cavity, said insert optically polished surface facing into said mold cavity being of specified surface curvature and said opposing pair of mold inserts thereby forming partforming surfaces of said mold cavity, said insert back surface being mechanically supported against a substantially mating face of a loadbearing support assembly which is capable of transmitting forces from said insert to a clamping platen of a injection molding machine, such that melt pressures which are exerted upon said partforming surfaces are ultimately supported by a countervailing clamping force applied by said injection molding machine;

b. an mated combination of a bore within said loadbearing support assembly, said bore having a threaded female surface which is coupled to a rotary threaded male shaft, wherein a rotary displacement of said shaft causes a predetermined displacement of said insert back surface being mechanically supported against said substantially mating face of said loadbearing support assembly, so as to make proportional the rotary displacement of said shaft to a corresponding change in the thickness of said lens;

c. means for adjustment of said thickness of said lens, said means for adjustment being capable of being moved to a plurality of positions when the mold is not filled with plastic;

d. means for mechanical linkage of motions of said mated combination of said shaft operating within said bore, in response to motions of said means for adjustment, by which motions a specified amount of rotary displacement of said shaft is produced when the mold is not filled with plastic; and e. means for locking said mated combination of said shaft operating within said bore, after said adjustment is made when the mold is not filled with plastic;

such that there is substantially no slippage between said mated combination of said shaft operating within said bore during subsequent injection molding cycles.

2. An injection mold apparatus for molding thermoplastic spectacle lens, said injection mold having a mechanism for determining a thickness of said lens by precisely adjusting and then locking into a fixed position said mechanism, the apparatus comprising:

a. said injection mold having at least one mold cavity formed between two mold halves which open and close about a parting line, with each mold half housing at least one of an opposing pair of optically polished mold inserts, each of said inserts having a surface facing into said mold cavity and each of said inserts having a back surface which faces away from said mold cavity, said insert optically polished surface facing into said mold cavity being of specified surface curvature and said opposing pair of mold inserts thereby forming partforming surfaces of said mold cavity, said opposing pair of mold inserts having in common a central axis, said insert back surface being mechanically supported against a substantially mating face of a loadbearing support assembly which is capable of transmitting forces from said insert within said moldhalf to a clamping platen of a injection molding machine, such that melt pressures which are exerted upon said partforming surfaces are ultimately supported by a countervailing clamping force applied by said injection molding machine;

b. a toggle mechanism mounted between said loadbearing support assembly and said clamping platen,
   wherein a lateral displacement of said toggle causes a predetermined axial displacement of said insert substantially in the same central axis as said opposing pair of mold inserts have in common, so that the lateral displacement of said toggle determines the change in the thickness of said lens;

c. means for adjustment for determining said thickness of said lens, said means for adjustment being capable of being moved to a plurality of positions when the mold is not filled with plastic;

d. means for mechanical linkage of motions of said toggle mechanism mounted between said loadbearing support assembly and said clamping platen, in response to motions of said means for adjustment, by which motions a specified amount of lateral displacement of said toggle is produced when the mold is not filled with plastic;

e. means for locking said toggle mechanism mounted between said loadbearing support assembly and said clamping platen after said adjustment is made when the mold is not filled with plastic;
   such that there is substantially no slippage between said toggle mechanism mounted between said loadbearing support assembly and said clamping platen during subsequent injection molding cycles.

3. An apparatus of claim 1 wherein said mated combination of said rotary threaded male shaft coupled to said bore having a threaded, lateral displacement female surface is driven by a mated worm and worm wheel gear assembly.

4. An apparatus of claim 1 wherein said means for locking said mated rotary threaded male shaft coupled to said bore into a fixed position is by rotation of a threaded set screw until mechanical interference is made against rotation of the worm gear assembly.

5. An apparatus of claim 4 wherein said means for locking said mated combination of said rotary threaded male shaft coupled to said bore into a fixed position is a set screw operating within a locking block assembly, said set screw operating axially substantially perpendicularly to an operating axis of said worm.

6. An apparatus of claim 1 wherein a pattern of cooling channels are machined within said inserts so as to provide for internal circulation of a heat-transfer fluid within said insert being maintained in fluid communication with supply lines into said loadbearing support assembly.

7. An apparatus of claim 6 wherein said inserts are made of a high thermal conductivity beryllium copper and having nickel or chromium plating on said optically polished surface of said insert.

8. An apparatus of claim 1 wherein said injection mold has at least one pre-enlarged, variable-volume mold cavity oversized at the start of each injection cycle with sufficiently great cavity height that a meltflow path would be nonconstrictive, and having a means for a compression stroke to be applied to the injected melt by creating a relative motion between said insert with respect to the parting-line reference plane, starting from a first position at the start of each injection cycle and ending at a second position at the end of each injection cycle.

9. An apparatus of claim 1 wherein said means for adjustment are external to said injection mold and are accessible to an operator for manual motion, and
   said means is a rotatable shaft driving said worm, said shaft being fitted with an external head accessible to an operator.

10. An apparatus of claim 9 wherein said means for adjustment external to said injection mold and accessible to an operator for manual motion employs different marked or numbered position settings, so as to be able to be recorded or quantified for reproducible settings at any future time.

11. An apparatus of claim 9 with means for measuring a setback distance by vernier gage or dial indicator, said setback distance being measured from said parting line to at least one of said curved optically polished mold inserts surface facing into said mold cavity.

12. An injection mold apparatus for molding thermoplastic vision-corrective spectacle lens, said injection mold having a mechanism determining a thickness of said lens being of a finished single vision family of differing optical magnification powers by precisely adjusting and then locking into a fixed position said mechanism without removing said injection mold mounted onto a clamping platen of an injection molding machine nor substantially disassembling said injection mold, the apparatus comprising:

a. said injection mold having a plurality of mold cavities formed between two mold halves which open and close about a parting line, with each mold half housing a plurality of opposing pairs of curved optically polished mold inserts, each of said inserts having a curved optically polished surface facing into said mold cavity and each of said inserts having a back surface which faces away from said mold cavity,
   said insert optically polished surface facing into said mold cavity being of specified surface curvatures and said opposing pair of mold inserts thereby forming partforming surfaces of said mold cavity, said opposing pair of mold inserts having in common a central axis,
   said insert back surface being mechanically supported against a substantially mating face of a loadbearing support assembly which in turn is capable of transmitting mechanical forces from said insert within said mold half to said clamping platen of said injection molding machine, such that melt pressures which are exerted upon said partforming surfaces of said mold cavity after being filled by injection are ultimately supported by a countervailing clamping force applied by said injection molding machine,
   said inserts having a pattern of cooling channels machined within said inserts so as to provide for internal circulation of a heat-transfer fluid within said insert being maintained in fluid communication with supply lines into said loadbearing support assembly,
   said inserts being made of a high thermal conductivity beryllium copper and having nickel or chromium plating on said optically polished surface of said inserts;
   said mold having a plurality of pre-enlarged, variable-volume mold cavities oversized at the start of each injection cycle with sufficiently great cavity height that the meltflow path would be relatively nonconstrictive, and the compression stroke being applied to injected melt by creating a relative motion between said inserts with respect to the parting-line reference plane, by sliding forward motion of said inserts axially within concentric bores of said mold, b. a mated combination of a bore within said loadbearing support assembly, said bore having a threaded female surface which is coupled to a rotary threaded male shaft, wherein a rotary displacement of said shaft causes a predetermined displacement of said insert back surface being mechanically supported against said substantially mating planar face of said loadbearing support assembly, so as to make proportional said rotary displacement of said shaft to a corresponding change in the thickness of said lens;

c. means for adjustment for determining said thickness of said lens external to said injection mold, said means for adjustment being capable of being moved to a plurality of positions when the mold is not filled with plastic;

d. means for mechanical linkage of motions of said mated combination of a bore within said loadbearing support assembly, said bore having a threaded female surface which is coupled to a rotary threaded male shaft, in response to operator manually-driven motions of said means for adjustment external to said injection mold, by which motions a specified amount of rotary displacement of said threaded male shaft is produced when the mold is not filled with plastic, said means for mechanical linkage of motions being a rotatable worm coupled to a worm wheel in a worm gear assembly;

e. means for locking said mated combination of said threaded bore with rotary threaded male shaft into a fixed position after said adjustment is made when the mold is not filled with plastic;

such that there is substantially no slippage between said mated combination of said threaded bore with rotary threaded male shaft within said loadbearing support assembly, during subsequent injection molding cycles, thereby determining a preset thickness of said lens.

13. A method for adjustment of thickness of an injection molded thermoplastic vision-corrective spectacle lens being of a finished single vision family of differing optical magnification powers without removing an injection mold mounted onto a clamping platen of an injection molding machine nor substantially disassembling said injection mold, said injection mold having at least one mold cavity formed between two mold halves which open and close about a parting line, with each mold half housing at least one of an opposing pair of optically polished mold inserts, each of said inserts having a surface facing into said mold cavity and each of said inserts having a back surface which faces away from said mold cavity,the method being employed as part of setup procedures before start of injection, the method comprising:

a. moving a means for adjustment external to said injection mold and accessible to an operator for manually driven motion to one of a plurality of positions, before starting injection molding cycles;

b. rotating a threaded male shaft mechanically linked to said means for adjustment, said threaded male shaft mating within a bore having a threaded female surface, said bore being within said loadbearing support assembly, wherein a rotary displacement of said shaft causes a predetermined displacement of said insert to a corresponding change in the thickness of said lens;

c. locking in place said mated threaded bore and shaft so as to prevent slippage therebetween during subsequent injection molding cycles.

14. A method of claim 13 with the additional steps of:

d. measuring a setback distance by suitable gage means before starting injection molding cycles, said setback distance being measured from said parting line to at least one of said curved optically polished mold inserts surface facing into said mold cavity, and making an initial adjustment wherein a safety factor is added to this measured setback distance to assure there can be no contact between the pair of opposing curved optically polished mold inserts surface facing into said mold cavity, then;

e. running at least one full cycle of said injection mold in said injection molding machine, thereby molding at least one of said lens;

f. measuring thickness of said lens and comparing the measured thickness to a predetermined desired thickness for said lens;

g. moving said means for adjustment as required, in order to make a corresponding adjustment to advance or retract said insert, running at least another full cycle of said injection mold, and measuring thickness of said lens and comparing the measured thickness to a predetermined desired thickness for said lens, and doing such iterations until the measured thickness and the predetermined desired thickness for said lens are within a predetermined tolerance of each other.

15. A method of claim 13 wherein a human operator, using said means for adjustment external to said injection mold and accessible to an operator for manual motion, employs different marked or numbered position settings with the added step of recording said marked position settings and/or quantifying numbered position settings so as to use the recorded settings to reproduce said settings at any future time.

16. A method of claim 13 with the additional steps of:

d. running at least one full cycle of said injection mold in said injection molding machine, thereby molding at least one of said lens;

e. measuring thickness of said lens and comparing the measured thickness to a predetermined desired thickness for said lens;

f. moving said means for adjustment as required, in order to make a corresponding adjustment to advance or retract said insert, running at least another full cycle of said injection mold, and measuring thickness of said lens and comparing the measured thickness to a desired thickness for said lens, and doing such iterations until the measured thickness and the desired thickness for said lens are within an acceptable tolerance of each other.

17. A method of claim 16 wherein the additional step of tightening said locking for preventing slippage between said mated threaded shaft and bore by preventing rotation of worm gear means for mechanical linkage follows the step of measuring thickness of said lens and comparing the measured thickness to a desired thickness for said lens.

* * * * *